United States Patent
Wei et al.

(10) Patent No.: US 10,545,742 B2
(45) Date of Patent: Jan. 28, 2020

(54) ANNOTATION-DRIVEN FRAMEWORK FOR GENERATING STATE MACHINE UPDATES

(71) Applicant: Nicira, Inc., Palo Alto, CA (US)

(72) Inventors: Michael Wei, Palo Alto, CA (US); Dahlia Malkhi, Palo Alto, CA (US); Medhavi Dhawan, Palo Alto, CA (US); Maithem Munshed, Palo Alto, CA (US)

(73) Assignee: Nicira, Inc., Palo Alto, CA (US)

(*) Notice: Subject to any disclaimer, the term of this patent is extended or adjusted under 35 U.S.C. 154(b) by 0 days.

(21) Appl. No.: 16/121,817

(22) Filed: Sep. 5, 2018

(65) Prior Publication Data

US 2019/0073201 A1 Mar. 7, 2019

Related U.S. Application Data (60) Provisional application No. 62/554,732, filed on Sep. 6, 2017.

(51) Int. Cl.
*G06F 9/45* (2006.01)
*G06F 8/41* (2018.01)
*G06F 9/448* (2018.01)

(52) U.S. Cl.
CPC .............. *G06F 8/458* (2013.01); *G06F 8/42* (2013.01); *G06F 9/4498* (2018.02)

(58) Field of Classification Search
CPC . G06F 8/458; G06F 8/42; G06F 8/433; G06F 9/4498
USPC ........................................................ 717/140
See application file for complete search history.

(56) References Cited

U.S. PATENT DOCUMENTS

| 5,170,465 A * | 12/1992 | McKeeman | G06F 8/20 717/145 |
| 6,260,186 B1 * | 7/2001 | James | H04M 3/4228 717/104 |
| 6,378,126 B2 * | 4/2002 | Tang | G06F 8/41 717/143 |
| 6,745,384 B1 * | 6/2004 | Biggerstaff | G06F 8/4441 712/203 |
| 9,996,387 B2 * | 6/2018 | Follett | G06F 15/17375 |
| 2004/0019883 A1 * | 1/2004 | Banerjee | G06F 8/4434 717/152 |
| 2004/0250164 A1 * | 12/2004 | Ahmad | G06F 11/364 714/30 |
| 2007/0112714 A1 * | 5/2007 | Fairweather | G06F 8/427 706/46 |
| 2010/0175045 A1 * | 7/2010 | Ciolfi | G06F 8/34 717/105 |

(Continued)

OTHER PUBLICATIONS

Title: Compile/run-time support for thread migration; author: H Jiang, published on 2001.*

(Continued)

*Primary Examiner* — Chameli Das
(74) *Attorney, Agent, or Firm* — Patterson + Sheridan, LLP (57) ABSTRACT

Embodiments of the present disclosure relate to techniques for maintaining a state of a distributed system. In particular, certain embodiments relate to identifying a function. Some embodiments relate to, upon determining that the function comprises an annotation indicating that the function is capable of modifying the state of the distributed system, transforming the function to allow the function to generate updates to a state machine.

18 Claims, 4 Drawing Sheets

(56) References Cited

U.S. PATENT DOCUMENTS

| | | | | |
|---|---|---|---|---|
| 2011/0096930 A1* | 4/2011 | Walmsley | ............. | H04L 9/0662 |
| | | | | 380/278 |
| 2011/0246962 A1* | 10/2011 | Meijer | ................. | G06F 9/4498 |
| | | | | 717/106 |
| 2011/0258594 A1* | 10/2011 | Syme | ..................... | G06F 8/445 |
| | | | | 717/106 |
| 2014/0025889 A1* | 1/2014 | Brown | ..................... | G06F 8/42 |
| | | | | 711/118 |
| 2015/0220309 A1* | 8/2015 | Howard | ................... | G06F 8/30 |
| | | | | 717/105 |
| 2017/0277560 A1* | 9/2017 | Lucas | .................. | G06F 9/4498 |
| 2017/0277800 A1* | 9/2017 | Lucas | .................. | G06F 9/4498 |

OTHER PUBLICATIONS

Title: HiLA: high-level aspects for UML state machines; author: G Zhang et al, published on 2009.*

Title: Tracing of state machine execution in the model-driven development framework; autoor: A Derezinska, et al, published on 2010.*

Title: Multi-stage programming with explicit annotations, author: W Taha et al, source ACM Sigplan, published on 1997.*

Michael Wei et al. "vCorfu: A Cloud-Scale Object Store on a Shared Log", 14th USENIX Symposium on Networked Systems Design and Implementation (NSDI '17). Mar. 27-29, 2017—ISBN 978-1-931971-37-9.

* cited by examiner

ANNOTATION-DRIVEN FRAMEWORK FOR GENERATING STATE MACHINE UPDATES

CROSS-REFERENCE TO RELATED APPLICATIONS

This application claims the benefit of U.S. Provisional Patent No. 62/554,732, filed Sep. 6, 2017. The content of the provisional application is hereby incorporated by reference in its entirety.

BACKGROUND

Distributed systems often use state machine replication in order to provide consistency across a plurality of nodes which make up a system. This involves modeling data and modifications to the data as a state machine and replicating the state machine so that every replica can arrive at the same state by performing the same updates. Since the rise of consensus protocols and distributed logging, which enable a distributed system to provide updates to replicas in order, state machine replication has become a popular mechanism for data replication. However, state machine replication generally requires that the state machine be generated. Most systems come with a single baked-in model that the user is forced to use, or the user is forced to generate their own-model, which is done by hand. This may be inefficient, time-consuming, and error-prone.

As such, there is a need in the art for a more efficient way of providing and maintaining a state machine in a distributed system.

DETAILED DESCRIPTION

Embodiments presented herein relate to techniques for maintaining a state of a distributed system. In certain embodiments, an annotation-based technique is used to allow methods to generate updates to a state machine. For example, a compile-time solution is provided (e.g., on a server) which scans source code and identifies annotations associated with methods in the source code. Software developers may add these annotations to methods in order to indicate whether, for example, a method is an "accessor", a "mutator", or both (also referred to as a mutator/accessor) (e.g., a method which is marked as a mutator modifies the state of the system, while a method marked solely as an accessor does not modify the state of the system). At compile-time, methods marked as "mutators" can be modified by embodiments of the present disclosure in order to allow the methods to generate updates to a distributed state machine. For example, a "mutator" method can be altered such that it generates a state machine update every time it is called at run-time, which may comprise writing an entry to a distributed log (which may be referred to as a "redo log"). In some embodiments, methods which contain no annotations are also modified to generate updates to the distributed state machine. Methods which are marked as "accessor" or "mutator/accessor" can be modified to include a verification step which ensures that the value returned by the method is of an acceptable type or within an acceptable range (e.g., based on rules defined in advance within the system).

In certain embodiments, annotations also indicate how to undo operations from a method which have been written to the state machine (e.g., allowing updates to be written to an "undo log" which can be used to reverse updates previously written to the state machine, e.g., the redo log). For example, an annotation for a method can indicate that operations from the method are undone by a different associated method, and embodiments of the present disclosure can use this annotation to determine how to reverse updates relating to this method.

At run-time, the methods which were modified at compile-time generate state machine updates each time they are called, and the clients associated with the distributed state machine remain in a synchronized state by "replaying" updates from the state machine. In certain embodiments, the state machine is replicated at a plurality of clients, each replica receiving all of the updates which are written to the centralized state machine (e.g., the redo log).

Because embodiments of the present disclosure only require developers to add simple annotations to methods rather than making the extensive changes which would otherwise be necessary to allow for maintaining a distributed state machine, solutions described herein may allow for significant cost and efficiency benefits. Furthermore, the error-prone process of manually generating a state machine is avoided. A state machine generally refers to one or more components that store the status of something at a given time and can operate on input to change the status and/or cause an action or output to take place for any given change. As used herein, a state machine is generally a log (e.g., a redo log) that maintains a state of various components in a distributed system. As used herein, something that occurs at "compile time" generally refers to something that occurs automatically during a process for compiling an application.

Figure 1:
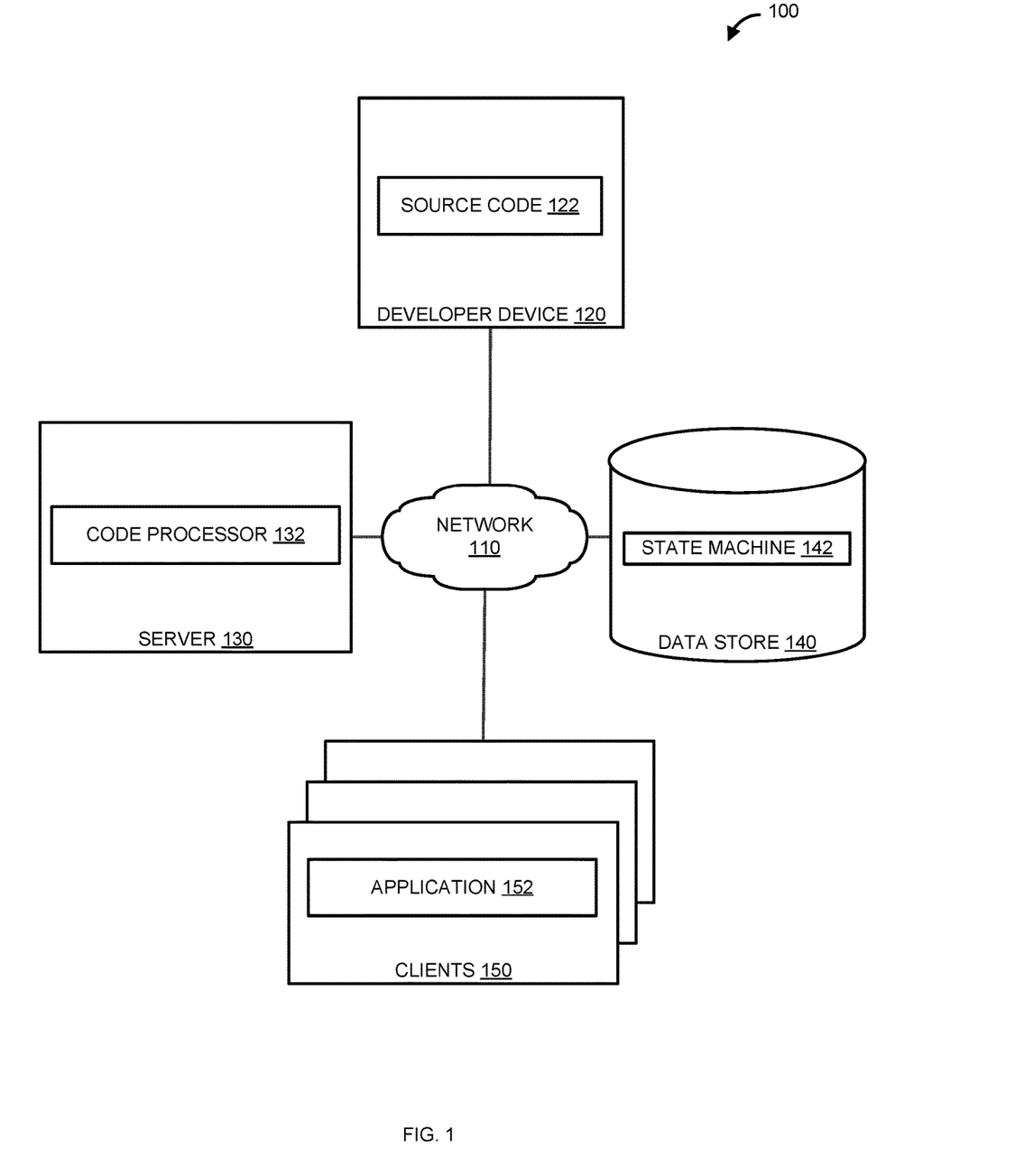
FIG. 1 illustrates components of an example computing environment in which embodiments of the present disclosure may be implemented.

FIG. 1 illustrates components of a computing environment 100 in which embodiments of the present disclosure may be implemented. As shown, system 100 includes a developer device 120, a server 130, a data store 140, and one or more clients 150, all of which communicate over network 110. Network 110 may, for example, comprise the Internet, a local area network (LAN), wide area network (WAN), cellular network, or the like. The components listed in FIG. 1 may alternatively be implemented as any number of local or distributed components.

Developer device 120 can comprise a physical or virtual computing device such as, for example, a desktop or laptop computer, server, mobile phone, tablet, virtual machine, data storage device, or the like. As shown, developer device 120 comprises source code 122, which may comprise source code for a software application (e.g., application 152). In some embodiments, source code 122 is stored in a local or remote repository which is maintained by software developers. According to embodiments of the present disclosure, developers can add annotations to one or more methods contained in source code 122 which allow for the methods to be identified and modified (e.g., by code processor 132) in order to generate state machine updates when called at run-time. An annotation can indicate that a method is or is not capable of modifying a state of the system or can indicate how an operation of the method is to be undone for the purpose of reversing an update from the method. For example, an annotation of "@Accessor" added to a method within an object (e.g., a class in Java) indicates that the method only accesses, and does not modify, the state of the system. An annotation of "@Mutator" indicates that a method does modify the state of the system. An annotation of "@AccessorMutator" indicates that the method both accesses and modifies the state of the system. Other annotations may include, for example "@TransactionalMethod" (e.g., indicating the method must be executed transactionally, objects being modified atomically) and "@Undo= . . . " (e.g., indicating how operations of the method are to be reversed, such as through a particular associated method, which may be listed in the annotation).

Server 130 can comprise a physical or virtual computing device such as, for example, a desktop or laptop computer, rack server, mobile phone, tablet, virtual machine, or the like. As shown, server 130 comprises a code processor 132, which performs operations to allow for maintaining a state of a distributed system, according to embodiments of the present disclosure. For example, code processor 132 scans source code 122 at compile-time in order to identify methods with and without annotations. In some embodiments, when code processor 132 identifies a method with an annotation indicating that it modifies the state of the system (e.g., indicating that the method is a mutator or mutator/accessor), code processor 132 modifies the method so that the method generates state machine updates. For example, code processor 132 instruments the method with code which causes the method to generate state machine updates (e.g., log entries to state machine 142) whenever the method is called at run-time. State machine updates may comprise, for example, the name of the method and any arguments which are present in a call to the method (e.g., if the method is named "put", and is called at run-time with two arguments, e.g. string values, the "put" method will write a log entry to state machine 142 which includes the name "put", as well as the two arguments which were included in the call). Code processor 132 can modify methods by, for example, adding function calls (e.g., to an application programming interface (API)) which generate and write state machine updates.

When code processor 132 identifies a method containing an annotation indicating that the method accesses the state of the system (e.g., accessor or mutator/accessor), code processor 132 can modify the method to include a verification step which ensures that the return value of the method is of an expected type or within an expected range (e.g., based on predetermined rules within code processor 132). In certain embodiments, methods which contain no annotations are treated by code processor 132 as if they modify the state of the system, and are instrumented accordingly. Methods which contain no annotations and have both input and output parameters, in some instances, are treated by code processor 132 as methods which both access and modify the state of the system (e.g., accessor/mutators), and may be instrumented accordingly.

In some embodiments, a method including an annotation indicating that the method is transactional (e.g., "@TransactionalMethod"), is modified so that state machine updates from the method are processed transactionally (e.g., multiple log entries are buffered until a transaction is complete, and then are written to state machine 142 as a single transaction).

In some embodiments, when code processor 132 identifies a method including an annotation indicating an "undo" function (e.g., a "@Undo" annotation may include information identifying the name of an undo function, which may be another method within the same class), code processor 132 modifies the method to include code which links the method to the identified undo method for purposes of state machine updates. At run-time, the undo method will be used to reverse updates from the method.

Data store 140 may comprise a data storage entity such as a database or repository, or may alternatively comprise a physical or virtual computing device such as, for example, a desktop or laptop computer, rack server, mobile phone, tablet, virtual machine, or the like. As shown, data store 140 comprises state machine 142. State machine 142 may, for example, comprise a log which is used to maintain a state of a distributed system (e.g., an application executing on one or more clients 150). State machine 142 can receive updates generated by clients 150 (e.g., when mutator methods modified by code processor 132 using techniques described herein are called at run-time), and clients 150 then read updates from state machine 142 in order to maintain a synchronized state. In some embodiments, state machine 142 is replicated at each of the one or more clients 150.

Each of clients 150 may comprise a physical or virtual computing device such as, for example, a desktop or laptop computer, rack server, mobile phone, tablet, virtual machine, or the like. As shown, clients 150 each comprise an application 152, which may collectively make up a distributed system. Application 152 is an example of an application compiled from source code 122 and modified by code processor 132 using techniques described herein. At run-time, methods within application 152 may generate updates to state machine 142, and each of the one or more clients 150 read these updates from state machine 142 in order to maintain a synchronized state throughout the distributed system.

Figure 2:
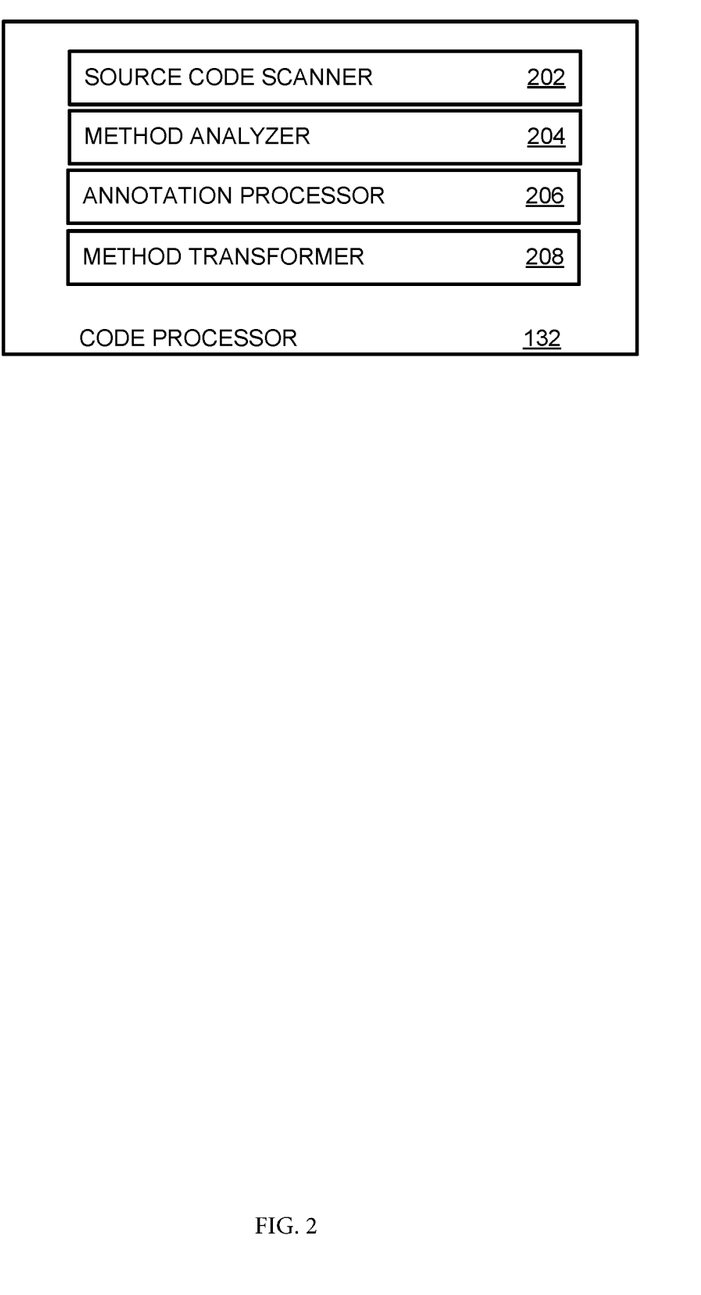
FIG. 2 illustrates components of a code processor according to embodiments of the present disclosure.

FIG. 2 illustrates components of a code processor 132, according to embodiments of the present disclosure. The components depicted in FIG. 2 are merely exemplary, and the functionality described as being performed by certain components may be performed by any number of local or remote components.

As shown, code processor 132 comprises a source code scanner 202, a method analyzer 204, an annotation processor 206, and a method transformer 208. Source code scanner 202, for example, scans source code 122 in order to identify methods (e.g., within classes), and pass the methods to method analyzer 204. Method analyzer 204 analyzes methods in order to determine whether the method contains annotations (e.g., based on a known format of annotations). Methods which contain one or more annotations are passed to annotation processor 206, which determines the content of the annotations and the appropriate action to be taken in response. For example, a method containing an annotation of "@Mutator" or "@MutatorAccessor" may be passed to method transformer 208, which automatically transforms the method such that it generates state machine updates when called at run-time. Method transformer 208 modifies methods by, for example, adding code which generates a log entry including a name of the method and any arguments passed in the method call, and provides the log entry to state machine 142. In some embodiments, as described above, methods containing an annotation of "@Accessor" or "@MutatorAccessor" can be modified by method transformer 208 to include code which verifies that values returned by the method are of an appropriate type or in an appropriate range. Other annotations can result in different changes to methods by method transformer 208, as described herein.

Figure 3:
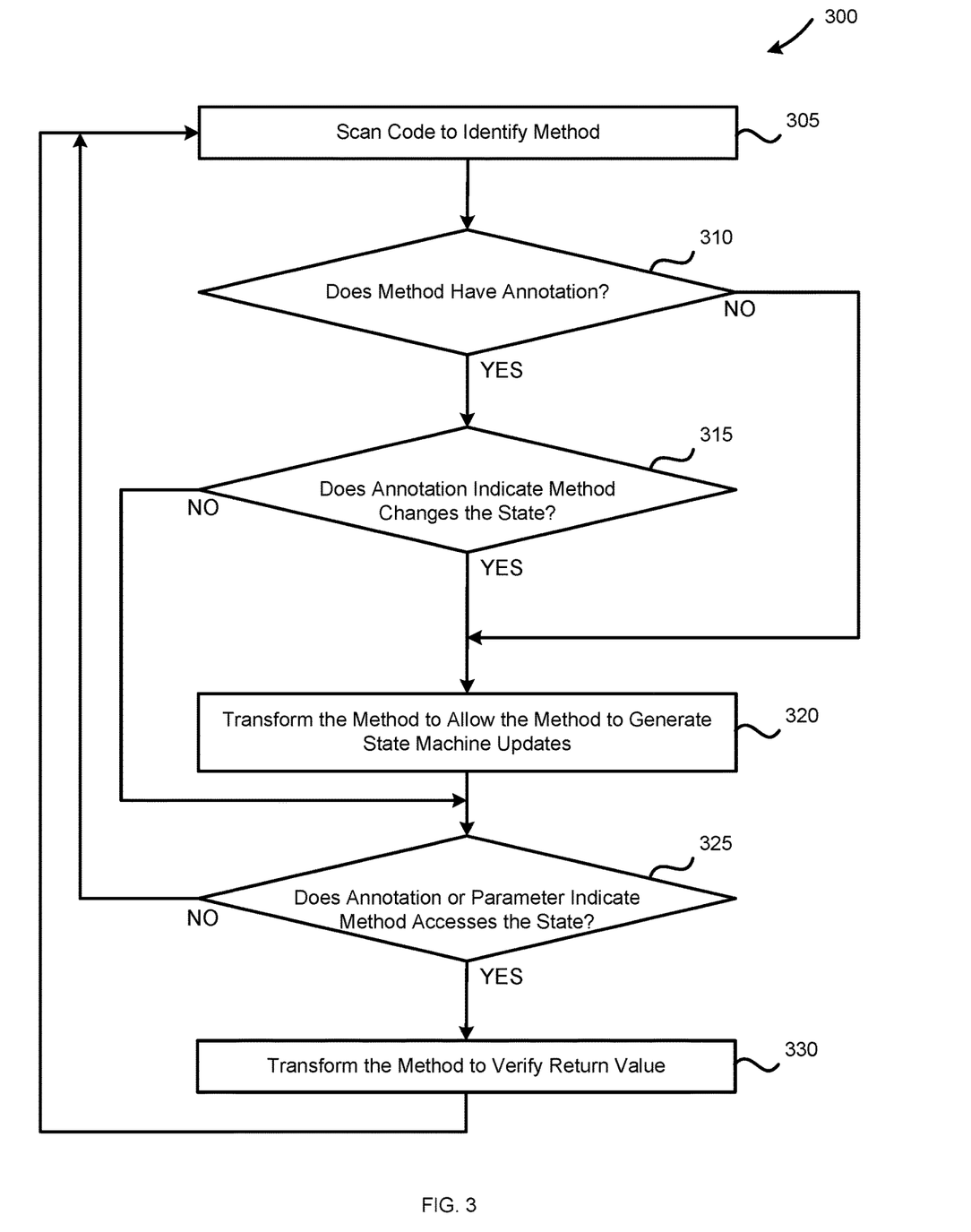
FIG. 3 illustrates example operations for maintaining a state of a distributed system according to embodiments of the present disclosure.

FIG. 3 illustrates example operations 300 for maintaining a state of a distributed system, according to embodiments of the present disclosure. Operations 300 may, for example be performed at compile-time by code processor 132.

At 305, code processor 132 scans source code 122 to identify a method. For example, code processor 305 looks for methods of objects, such as classes, in the code. When code processor 132 has identified a method, operations continue at 310.

At 310, code processor 132 determines whether the method has an annotation. For example, developers add annotations to methods which are recognized by code processor 132 according to techniques described herein. If code processor 132 determines that the method does not have an annotation, operations continue at 320, where the method is treated as if it does modify the state of the system. If code processor 132 determines that the method does have an annotation, operations continue at 315.

At 315, code processor 132 determines whether the annotation indicates that the method changes the state of the system. For example, code processor 132 determines whether the annotation indicates that the method is a mutator or mutator/accessor. If code processor 132 determines that the annotation does not indicate that the method changes the state of the system, operations continue at 325. Otherwise, operations continue at 320.

At 320, code processor 132 transforms the method to allow the method to generate state machine updates. For example, code processor 132 modifies the method to include function calls (e.g., using an API) which, when the method is called at run-time, generate log entries listing information such as the name of the method and arguments included in the call.

At 325, code processor 132 determines whether the annotation or a parameter (e.g., a return value of the method) indicates that the method accesses the state of the system. For example, an annotation of "@Accessor" or "@MutatorAccessor" indicates that the method accesses the state of the system. Furthermore, in the case that the method does not have an annotation, the presence of a return value in the method indicates that the method accesses the state of the system. If code processor 132 determines that the method does not access the state of the system, operations return to 305. Otherwise, operations continue at 330.

At 330, code processor 132 modifies the method to verify the return value. For example, code processor 132 adds code to the system which verifies that a value returned by the method at run-time is of an appropriate type or is within an appropriate range, based on predetermined rules within code processor 132. Operations then return to 305 where code processor 132 continues the scan the source code for methods (until the source code has been completely scanned).

Figure 4:
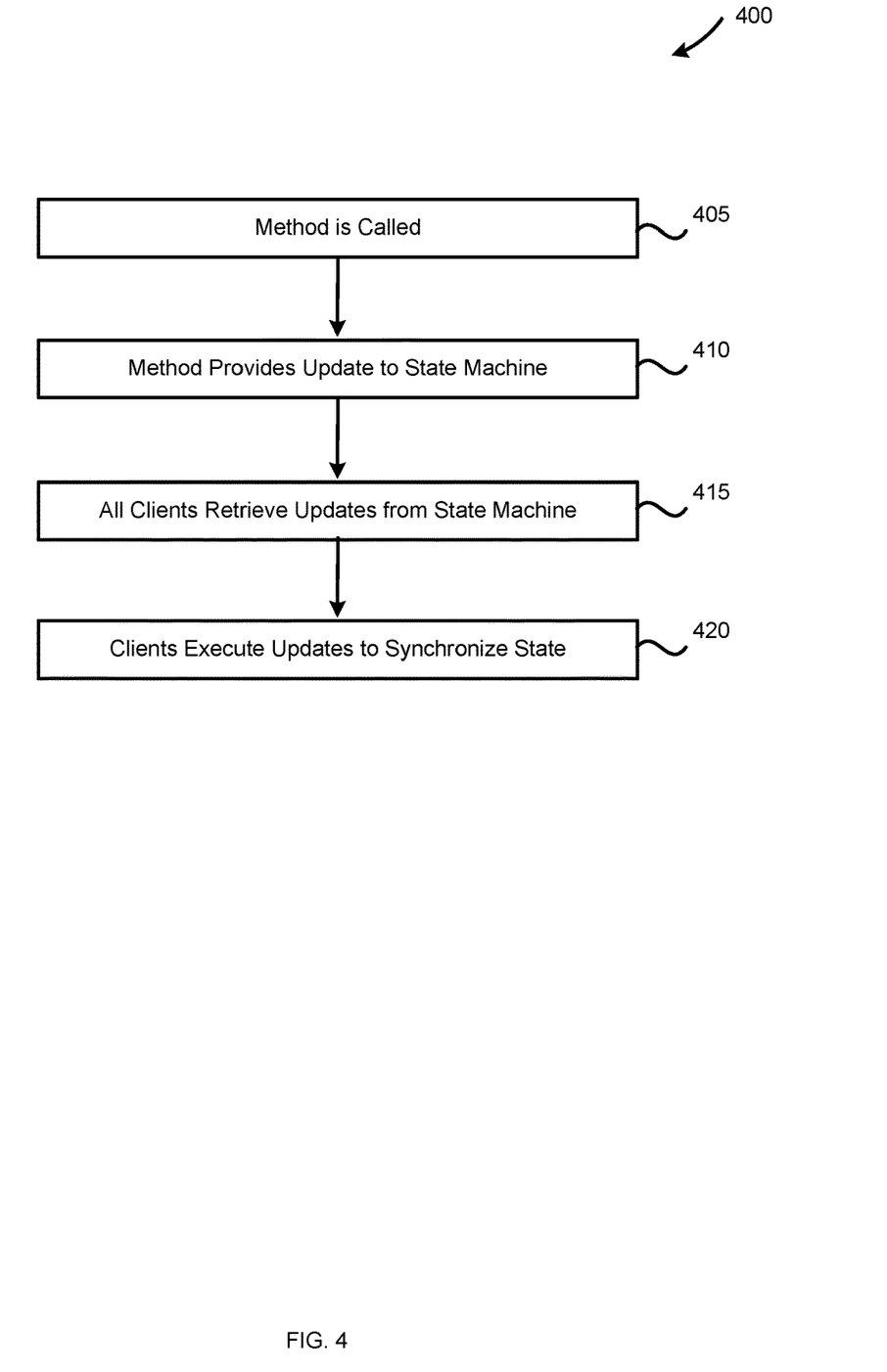
FIG. 4 further illustrates example operations for maintaining a state of a distributed system according to embodiments of the present disclosure.

FIG. 4 illustrates example operations 400 for maintaining a state of a distributed system, according to embodiments of the present disclosure. Operations 400 may, for example, be performed at run-time by clients 150.

At 405, a method is called (e.g., during execution of application 152 on a client 150, which may be one of a plurality of clients 150 in a distributed system). For example, a "put" method may be called during execution of application 152.

At 410, the method provides an update to state machine 142. For example, a method may have been modified by code processor 132 such that it generates a state machine update every time it is called at run-time. The state machine update, for example, comprises a log entry to state machine 142 which includes the name of the method (e.g., "put"), and any arguments which were included in the method call.

At 415, all clients 150 retrieve the update from state machine 142. For example, each of the one or more clients 150 in the distributed system retrieve the update (along with any other new updates from state machine 142), and use application 152 to execute the operations described therein in order to stay in a synchronized state with the rest of the distributed system.

At 420, clients 150 execute the update in order to maintain a synchronized state. For example, each of clients 150 may execute the call to the "put" method using the arguments described in the update from state machine 142. This will allow each of clients 150 to remain in a synchronized state.

Embodiments of the present disclosure may be useful in a vast number of contexts, as they allow for a state to be maintained in a distributed system which does not offer native state machine support. Furthermore, while particular techniques may be described herein, involving particular types of components, annotations, and state machines (e.g., a log), embodiments may involve the use of different techniques without departing from the scope of the present disclosure.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for compiling an application from source code, comprising:
    scanning the source code at compile time;
    identifying code for a first function in the source code based on the scanning;
    determining whether the first function is capable of modifying a state of a distributed system when executed by the distributed system based on whether the code for the first function is annotated in the source code with a first annotation indicating that the first function is capable of modifying the state of the distributed system;
    upon determining that the first function is capable of modifying the state of the distributed system: automatically inserting into the source code additional code configured to run when the first function is executed by the distributed system, the additional code comprising code for a call to at least a second function that, when executed at run-time, generates an update to a state machine of the distributed system, the state machine indicating the state of the distributed system;
    upon determining that the code for the first function is annotated in the source code with a second annotation indicating that the first function accesses the state of the distributed system: automatically transforming the code of the first function in the source code to allow the first function, when executed by the distributed system, to verify a return value; and
    compiling the application from the source code.

2. The method of claim 1, wherein the state machine comprises a centralized log, and wherein updates to the state machine comprise log entries.

3. The method of claim 1, further comprising:
    upon determining that the code for the first function is not annotated in the source code with any of a plurality of annotations:
        automatically transforming the code of the first function in the source code to include code for one or more additional function calls that allow the first function to generate updates to the state machine when executed by the distributed system.

4. The method of claim 1, wherein the second function generates an update to the state machine when the first function is called at run-time.

5. The method of claim 1, wherein one or more clients read updates from the state machine in order to remain in a synchronized state.

6. The method of claim 1, further comprising:
    upon determining that the code for the first function is annotated with a second annotation indicating that the first function is a transactional function:
        automatically transforming the code for the first function in the source code to allow the first function, when executed by the distributed system, to generate a plurality of updates to the state machine and provide the plurality of updates to the state machine as a single transaction.

7. A computer system, wherein system software for the computer system is programmed to execute a method for compiling an application from source code, the method comprising:
    scanning the source code at compile time;
    identifying code for a first function in the source code based on the scanning;
    determining whether the first function is capable of modifying a state of a distributed system when executed by the distributed system based on whether the code for the first function is annotated in the source code with a first annotation indicating that the first function is capable of modifying the state of the distributed system;
    upon determining that the first function is capable of modifying the state of the distributed system: automatically inserting into the source code additional code configured to run when the first function is executed by the distributed system, the additional code comprising code for a call to at least a second function that, when executed at run-time, generates an update to a state machine of the distributed system, the state machine indicating the state of the distributed system;
    upon determining that the code for the first function is annotated in the source code with a second annotation indicating that the first function accesses the state of the distributed system: automatically transforming the code of the first function in the source code to allow the first function, when executed by the distributed system, to verify a return value; and
    compiling the application from the source code.

8. The computer system of claim 7, wherein the state machine comprises a centralized log, and wherein updates to the state machine comprise log entries.

9. The computer system of claim 7, wherein the method further comprises:
upon determining that the code for the first function is not annotated in the source code with any of a plurality of annotations:
automatically transforming the code of the first function in the source code to include code for one or more additional function calls that allow the first function to generate updates to the state machine when executed by the distributed system.

10. The computer system of claim 7, wherein the second function generates an update to the state machine when the first function is called at run-time.

11. The computer system of claim 7, wherein one or more clients read updates from the state machine in order to remain in a synchronized state.

12. The computer system of claim 7, wherein the method further comprises:
upon determining that the code for the first function is annotated with a second annotation indicating that the first function is a transactional function:
automatically transforming the code for the first function in the source code to allow the first function, when executed by the distributed system, to generate a plurality of updates to the state machine and provide the plurality of updates to the state machine as a single transaction.

13. A method for compiling an application from source code, comprising:
scanning the source code at compile time;
identifying code for a first function in the source code based on the scanning;
determining whether the first function is capable of modifying a state of a distributed system when executed by the distributed system based on whether the code for the first function is annotated in the source code with a first annotation indicating that the first function is capable of modifying the state of the distributed system;
upon determining that the first function is capable of modifying the state of the distributed system: automatically inserting into the source code additional code configured to run when the first function is executed by the distributed system, the additional code comprising code for a call to at least a second function that, when executed at run-time, generates an update to a state machine of the distributed system, the state machine indicating the state of the distributed system;
upon determining that the code for the first function is annotated with a second annotation indicating that the first function is a transactional function: automatically transforming the code for the first function in the source code to allow the first function, when executed by the distributed system, to generate a plurality of updates to the state machine and provide the plurality of updates to the state machine as a single transaction; and
compiling the application from the source code.

14. The method of claim 13, wherein the state machine comprises a centralized log, and wherein updates to the state machine comprise log entries.

15. The method of claim 13, further comprising:
upon determining that the code for the first function is annotated in the source code with a second annotation indicating that the first function accesses the state of the distributed system when executed by the distributed system:
automatically transforming the code of the first function in the source code to allow the first function to verify a return value when executed by the distributed system.

16. The method of claim 13, further comprising:
upon determining that the code for the first function is not annotated in the source code with any of a plurality of annotations:
automatically transforming the code of the first function in the source code to include code for one or more additional function calls that allow the first function to generate updates to the state machine when executed by the distributed system.

17. The method of claim 13, wherein the second function generates an update to the state machine when the first function is called at run-time.

18. The method of claim 13, wherein one or more clients read updates from the state machine in order to remain in a synchronized state.

* * * * *